United States Patent [19]

Uchida et al.

[11] Patent Number: 5,380,809
[45] Date of Patent: Jan. 10, 1995

[54] COMPOSITION FOR OPTICAL MATERIAL

[75] Inventors: Hiroshi Uchida; Yasuji Tanaka, both of Oita, Japan

[73] Assignee: Showa Denko K.K., Tokyo, Japan

[21] Appl. No.: 111,879

[22] Filed: Aug. 26, 1993

[30] Foreign Application Priority Data

Aug. 26, 1992 [JP] Japan .................................. 4-248921

[51] Int. Cl.6 ......................... C08F 18/24; C08F 22/14
[52] U.S. Cl. ............................... 526/318.43; 526/280; 526/281; 526/282; 526/314; 526/318.4; 526/321; 528/272; 528/306; 528/308; 528/308.6
[58] Field of Search ................ 528/272; 526/314, 321, 526/282, 318.43

[56] References Cited

U.S. PATENT DOCUMENTS

| | | | |
|---|---|---|---|
| 3,937,689 | 2/1976 | Mitani et al. | |
| 4,217,433 | 8/1980 | Dyball | 525/277 |
| 4,959,451 | 9/1990 | Uchida | 528/272 |
| 5,130,393 | 7/1992 | Nakamura | 526/314 |
| 5,218,067 | 6/1993 | Uchida et al. | 526/261 |

FOREIGN PATENT DOCUMENTS

| | | |
|---|---|---|
| 0302537 | 2/1989 | European Pat. Off. . |
| 0472168 | 2/1992 | European Pat. Off. . |
| 52-60892 | 5/1977 | Japan . |

*Primary Examiner*—Fred Zitomer
*Attorney, Agent, or Firm*—Sughrue, Mion, Zinn, Macpeak & Seas

[57] ABSTRACT

A composition for an optical material consisting essentially of a polyallyl carbonate of linear or branched alkylene glycols, an allyl ester oligomer having allyl ester groups at the terminals thereof and a main chain derived from an alicyclic dicarboxylic acid and a polyhydric saturated alcohol, and if desired, a diallyl ester, alkyl (meth)acrylate, dialkyl maleate or dialkyl fumarate monomer.

4 Claims, No Drawings

1

COMPOSITION FOR OPTICAL MATERIAL

BACKGROUND OF THE INVENTION

1. Field of the Invention

This invention generally relates to a composition for an optical material. More specifically, it relates to a composition for an optical material which has a refractive index and weatherability equivalent to those of diethylene glycol bis(allyl carbonate), which has been used for eyeglass lenses and other optical applications (and which will be hereinafter referred to as the "above-mentioned compound"), has a low shrinkage ratio at the time of polymerization, and moreover has excellent impact strength.

2. Description of the Related Art

Organic glass is lighter in weight than inorganic glass. Accordingly, organic glass consisting of the polymer of the above-mentioned compound has been used for eyeglass lenses. However, the volume shrinkage ratio of the above-mentioned compound is as great as 14% during casting polymerization. For this reason, there remains the problem that cracks are likely to occur in molded articles when molding is carried out within a short period of time.

To avoid this problem, industrial production of organic glass has been carried out by partially polymerizing the above-mentioned compound so as to increase its viscosity, and then effecting molding slowly at a low temperature in the course of more than 12 hours using a radical polymerization initiator of a low temperature decomposition type having a high activity such as diisopropylperoxy dicarbonate.

However, this method has extremely low productivity and is not economical. Therefore, Japanese Unexamined Patent Publication (Kokai) No. 52-60892 proposes a method which combines an aliphatic ethylenically unsaturated polyester with an unsaturated monomer, as a method of reducing a shrinkage ratio. However, since fumaric acid and maleic acid are used as the ethylenically unsaturated group in this case, there remains the problem that a radical polymerization rate becomes so fast that control during polymerization becomes difficult and distortion becomes more likely to occur during this process.

On the other hand, U.S. patent specification No. 4,217,433 proposes a method which dissolves a copolymer of methyl methacrylate and allyl methacrylate in the above-mentioned compound in order to reduce the shrinkage ratio at the time of polymerization. However, this method is not yet free from the problems that the copolymer as the starting material is expensive, and if the proportion of allyl methacrylate of the copolymer is high, a cross-linkage density of the molded article becomes so high that the resulting product becomes brittle, and if the proportion of methyl methacrylate is so high, transparency of the cured product drops.

An allyl ester which has an allyl ester group at the terminal, the main molecular chain of which is derived from a polyvalent aromatic or saturated aliphatic carboxylic acid and a polyhydric saturated alcohol, and which has a structure represented by the following formula, is also knowns:

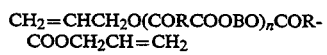

wherein, R represents an organic residue derived from a polyvalent aromatic or saturated aliphatic carboxylic acid, B represents an organic residue derived from a polyhydric saturated alcohol, and n is an integer.

In this case, if terephthalic acid or isophthalic acid is used as the polyvalent saturated aromatic carboxylic acid, a refractive index is relatively high and impact resistance is also excellent. However, weatherability in this case is by far lower than when the above-mentioned compound is used. Therefore, this glass does not provide satisfactory performance as organic glass which is assumed to be used as a lens for outdoor use without any correction factor such as glass for sunglasses.

SUMMARY OF THE INVENTION

It is a main object of the present invention to provide a composition for an optical material which solves the problems with the prior art as described above, uses economical starting materials, does not generate cracks in molded articles even when a curing rate is high, has a refractive index and weatherability equivalent to those of diethylene glycol bis(allyl carbonate), has a low shrinkage ratio at the time of polymerization and moreover, has excellent impact resistance.

As a result of intensive studies for solving the problems described above, the inventors of the present invention have found that the object described above can be accomplished by a composition for an optical material consisting essentially of a polyallyl carbonate of a linear or branched alkylene glycol, an allyl ester oligomer having an allyl ester group at the terminal thereof, having thereinside a cyclohexane and/or cyclohexene skeletal structure, and derived from a dicarboxylic acid and a polyhydric saturated alcohol, and if necessary, a diallyl cyclohexane-dicarboxylate monomer. The present invention has thus been completed.

According to the present invention, therefore, there is provided a composition for an optical material which essentially consists of 5 to 80 wt % of a polyallyl carbonate of a linear or branched alkylene glycol, 20 to 70 wt % of an allyl ester oligomer having allyl ester groups at the terminal ends thereof and recurring units represented by the following general formula (I)

$$+(COACOO)_x-Z-O+ \qquad (I)$$

wherein x is an integer of 1 to 10, A represents an organic residue represented by one of the following structures 1 to 6,

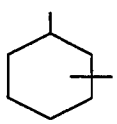

1.

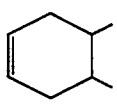

2.

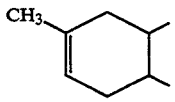

3.

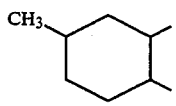
4.

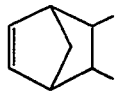
5.

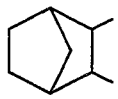
6.

and Z represents organic residue derived from a $C_2$ to $C_{30}$ polyol having $x+1$ hydroxyl groups; and 0 to 50 wt % of at least one monomer selected from the group consisting of diallyl 1,2-, 1,3- and 1,4-cyclohexanedicarboxylates, diallyl 4-cyclohexene-1,2-decarboxylate, diallyl methyl-4-cyclohexene-1,2-dicarboxylate, diallyl [2,2,1]bicyclo-2-heptene-5,6-dicarboxylate, diallyl [2,2,1]bicyclo-heptane-2,3-dicarboxylate, alkyl acrylate, alkyl methacrylate, dialkyl maleate and dialkyl fumarate.

DESCRIPTION OF THE PREFERRED EMBODIMENTS

Examples of the polyallyl carbonate of the linear or branched alkylene glycol that is useful for the present invention are compounds represented by the following general formula (II)

$$(CH_2=CHCH_2-OCOO)_y-Y-OCOO-CH_2CH=CH_2 \quad (II)$$

wherein y is an integer of 1 to 10 and Y represents an organic residue derived from a $C_2$ to $C_{12}$ polyol having $y+1$ hydroxyl groups.

Examples of the dihydric saturated alcohols providing Y are saturated glycols the main chain of which consists solely of carbons such as ethylene glycol, propylene glycol, 1,3-propanediol, 1,4-butanediol, 1,3-butanediol, neopentyl glycol, 1,5-pentanediol, hexamethylene glycol, 1,4-cyclohexanedimethanol, etc., and dihydric saturated alcohols containing an ether group in the main molecular chain thereof such as diethylene glycol, triethylene glycol, polyethylene glycol, dipropylene glycol, and so forth.

Examples of tri- and more polyhydric saturated alcohols are glycerin, trimethylolethane, trimethylolpropane, pentaerythritol, sorbitol, etc. Among them, diethylene glycol has good industrial record of performance and is therefore most preferred. [An example of diethylene glycol bis(allyl carbonate) is "CR-39", a product of PPG Industries, Inc.]

The blend amount of the components described above is from 5 to 80 wt %, more preferably from 20 to 70 wt %, because the volume shrinkage ratio is not reduced if the amount is too great, and a polymerization initiator must be used if the amount is too small.

The allyl ester oligomer of the formula (I) used in the present invention can be synthesized from the corresponding dicarboxylic acid diallyl esters and polyhydric alcohols as described in Japanese Unexamined Patent Publication (Kokai) No. 2-25150, though the starting materials are different.

Examples of the dihydric saturated alcohols providing Z are those saturated glycols the main molecular chain of which consists solely of carbons in the same way as Y described above, such as ethylene glycol, propylene glycol, 1,3-propanediol, 1,4-butanediol, 2-methyl-1,3-propanediol, 1,3-butanediol, neopentyl glycol, 1,5-pentanediol, hexamethylene glycol, heptamethylene glycol, octamethylene glycol, nonamethylene glycol, decamethylene glycol, undecamethylene glycol, dodecamethylene glycol, tridecamethylene glycol, eicosamethylene glycol, hydrogenated bis-phenol A, 1,4-cyclohexane dimethanol, 2-ethyl-2,5-pentanediol, 2-ethyl-1,3-hexanediol, etc., and dihydric saturated alcohols containing an ether group in the molecular chain thereof such as diethylene glycol, triethylene glycol, polyethylene glycol, dipropylene glycol, and so forth. Among them, glycols such as neopentyl glycol, ethylene glycol, propylene glycol and 1,3-butanediol are preferred because Tg of the resulting cured product does not drop much and weatherability is high.

Examples of tri- and more polyhydric saturated alcohols are glycerin, trimethylolethane, trimethylolpropane, pentaerythritol and sorbitol. The use of these alcohols is preferred from the aspect of heat resistance, but since the viscosity of the resulting allyl ester is remarkably increased, the amount of use is preferably limited to a small amount.

The blend amount of this allyl ester oligomer is preferably not very great because the viscosity becomes excessively high, depending on the molecular weight, and if the blend amount is excessively small, the shrinkage ratio cannot be reduced. Therefore, the blend amount is preferably selected from the range of 20 to 70 wt %, and more preferably from 30 to 60 wt %.

If the viscosity becomes excessively great by the use of only the two components described above, it is preferred to add at least one kind of monomers selected from the group consisting of diallyl 1,2-, 1,3- and 1,4-cyclohexanedicarboxylates, diallyl 4-cyclohexene-1,2-dicarboxylates, diallyl methyl-4-cyclohexene-1,2-dicarboxylates, diallyl [2,2,1]bicyclo-2-heptene-5,6-dicarboxylate, diallyl [2,2,1]bicycloheptane-2,3-dicarboxylate, alkyl acrylate, alkyl methacrylate, dialkyl maleate and dialkyl fumarate, in order to keep optical characteristics. However, if the amount of the monomer is excessively great, the volume shrinkage ratio becomes too high at the time of polymerization in some cases. For this reason, the amount of use is preferably limited to below 50 wt %, more preferably below 30 wt %.

The viscosity after blending is important. If the viscosity is excessively high, the casting polymerization ordinarily employed for the above-mentioned compounds cannot be executed and if it is excessively low, on the other hand, the operation of increasing the viscosity by a preparatory polymerization becomes necessary in the same way as in the case of the above-mentioned compound. Therefore, the viscosity after blending is from 20 to 20,000 cps (30° C.), more preferably from 80 to 3,000 cps (30° C.), within the blend ratio (weight ratio) described above, and blending is so carried out as to attain this range.

Besides the compounds described above, dilution by other polymerizable monomers can naturally be conducted. Examples of such monomers include allyl ester monomers such as allyl benzoate, diallyl phthalate, diallyl isophthalate, diallyl terephthalate, diallyl adipate, triallyl isocyanurate, triallyl trimellitate, etc., esters of (meth)acrylic acid such as phenyl (meth)acrylate, benzyl (meth)acrylate, etc., and vinyl esters such as vinyl benzoate, divinyl adipate, etc. However, the blend amount of these monomers should be limited to a range which does not exceed the gist of the present invention and which does not change the properties of the composition of the present invention.

A radical curing agent is added to the composition of the present invention and then curing is carried out. Any radical polymerization initiators can be used as this curing agent so long as they can generate a radical by heat, micro-wave, infrared ray or ultra-violet ray, and a suitable curing agent is selected in accordance with the application, object, blend ratio of components and curing method of curable compositions.

From the aspect of practical application, it is preferred to employ a casting polymerization method by using 1 to 10 parts by weight of a percarbonate such as diisopropylperoxy dicarbonate, di-n-propylperoxy dicarbonate or di-sec-butylperoxy dicarbonate, on the basis of the polymerizable composition, and carrying out the polymerization at a temperature in the range of 30° C. to 100° C. in the same way as in the polymerization of the above-mentioned compound, for curing and obtaining an optical material such as an organic lens, because this method does not require a change of existing production lines. However, casting must be carried out at a high temperature in some cases depending on the viscosity of the blend composition. In such cases, an initiator having a high decomposition temperature such as dicumyl peroxide, di-t-butyl peroxide should be used.

Hereinafter, the present invention will be described in further detail with reference to examples thereof, but is in no way limited thereto, without departing from the spirit of the present invention.

Preparation of allyl ester oligomers

Referential Example 1

500g of diallyl 1,4-cyclohexanedicarboxylate monomer, 101g of propylene glycol and 0.5g of dibutyltin oxide were fed into a 1 l three-neck flask equipped with distilling equipment, and were heated to 180° C. under a nitrogen stream so as to distill off the resulting allyl alcohol. When about 90 g of allyl alcohol was distilled off, the pressure of the reaction system was reduced to about 10 mmHg to increase the distillation rate of allyl alcohol. After a theoretical amount of allyl alcohol was distilled, heating was further continued for 1 hour, and the reaction system was finally retained at 190° C. and 1 mmHg for 1 hour. Then, the reactor was cooled, and 440 g of a polymerizable oligomer was obtained containing 11 wt % of diallyl 1,4-cyclohexanedicarboxylate. Hereinafter, this oligomer will be called "starting material-A".

Referential Example 2

500 g of a diallyl 1,4-cyclohexanedicarboxylate monomer, 86 g of neopentyl glycol, 22.5 g of pentaerythritol and 0.5 g of dibutyltin oxide were fed into a 1 l three-neck flask equipped with distilling equipment, and were heated to 180° C. under a nitrogen stream so as to distill off the resulting allyl alcohol. When about 85 g of allyl alcohol was distilled, the pressure of the reaction system was reduced to about 10 mmHg to increase the distillation rate of allyl alcohol. After a theoretical amount of allyl alcohol was distilled, heating was further continued for 1 hour, and the reaction system was finally retained at 190° C. and 1 mmHg for 1 hour. Then, the reactor was cooled, and 470 g of a polymerizable oligomer was obtained containing 18 wt % of diallyl 1,4-cyclohexanedicarboxylate monomer. Hereinafter, this oligomer will be called "starting material-B".

Referential Example 3

500 g of diallyl 1,3-cyclohexanedicarboxylate (CHDA), 138 g of neopentyl glycol and 0.5 of dibutyltin oxide were fed into a 1 l three-neck flask equipped with distilling equipment, and were heated to 180° C. under a nitrogen stream so as to distill off the resulting allyl alcohol. When about 100 g of allyl alcohol was distilled off, the pressure of the reaction system was reduced to 10 mmHg to increase the distillation rate of allyl alcohol. After a theoretical amount of allyl alcohol was distilled, heating was further continued for 1 hour and the reaction system was finally retained at 190° C. and 1 mmHg for 1 hour. Then, the reactor was cooled and 480 g of a polymerizable oligomer was obtained containing 10 wt % of the CHDA monomer. Hereinalter, this oligomer will be called "starting material-C".

Referential Example 4

500 g of a diallyl 1,4-cyclohexanedicarboxylate monomer, 82 g of ethylene glycol and 0.5 g of dibutyltin oxide were fed into a 1 l three-neck flask equipped with distilling equipment, and were heated to 180° C. under a nitrogen stream so as to distill off the resulting allyl alcohol. When about 90 g of allyl alcohol was distilled off, the pressure of the reaction system was reduced to 10 mmHg to increase the distillation rate of allyl alcohol. After a theoretical amount of allyl alcohol was distilled, heating was further continued for 1 hour, and the reaction system was finally retained at 190° C. and 1 mmHg for 1 hour. Then, the reactor was cooled, and 425 g of a polymerizable oligomer was obtained containing 12 wt % of diallyl 1,4-cyclohexanedicarboxylate monomer. This monomer will be called "starting material-D".

Referential Example 5

500 g of a diallyl 1,4-cyclohexanedicarboxylate monomer, 144 g of diethylene glycol and 0.5 g of dibutyltin oxide were fed into a 1 l three-neck flask equipped with distilling equipment, and were heated to 180° C. under a nitrogen stream so as to distill off the resulting allyl alcohol. When about 100 g of allyl alcohol was distilled off, the pressure of the reaction system was reduced to 10 mmHg to increase the distillation rate of allyl alcohol. After a theoretical amount of allyl alcohol was distilled, heating was further continued for 1 hour, and the reaction system was finally retained at 190° C. and 1 mmHg for 1 hour. Then, the reactor was cooled, and 485 g of a polymerizable oligomer was obtained containing 9 wt % of a diallyl 1,4-cyclohexanedicarboxylate monomer. This oligomer will be called "starting material-E".

Referential Example 6

500 g of a diallyl 1,2-cyclohexanedicarboxylate monomer, 58 g of neopentyl glycol and 0.5 g of dibutyltin oxide were fed into a 1 l three-neck flask equipped with distilling equipment, and were heated to 180° C. under a nitrogen stream so as to distill off the resulting allyl alcohol. When about 40 g of allyl alcohol was distilled off, the pressure of the reaction system was reduced to 10 mmHg to increase the distillation rate of allyl alcohol. After a theoretical amount of allyl alcohol was distilled, heating was further continued for 1 hour, and the reaction system was finally retained at 190° C. and 1 mmHg for 1 hour. Then, the reactor was cooled, and 425 g of a polymerizable oligomer was obtained containing 41 wt % of a diallyl 1,2-cyclohexanedicarboxylate monomer. This oligomer will be called "starting material-F".

Referential Example 7

500 g of a diallyl 1,4-cyclohexanedicarboxylate monomer, 50 g of propylene glycol, 87 g of neopentyl glycol and 0.5 g of dibutyltin oxide were fed into a 1 l three-neck flask, and were heated to 180° C. under a nitrogen stream so as to distill off the resulting allyl alcohol. When about 120 g of allyl alcohol was distilled off, the pressure of the reaction system was reduced to 10 mmHg to increase the distillation rate of allyl alcohol. After a theoretical amount of allyl alcohol was distilled, heating was further continued for 1 hour, and the reaction system was finally retained at 180° C. and 1 mmHg for 1 hour. Then, the reactor was cooled, and 485 g of a polymerizable oligomer was obtained containing a 4 wt % of a diallyl 1,4-cyclohexanedicarboxylate monomer. This oligomer will be called "starting material-G".

Referential Example 8

500 g of a diallyl 1,4-cyclohexanedicarboxylate monomer, 260 g of tricyclodecane dimethanol and 0.5 g of dibutyltin were fed into a 1 l three-neck flask equipped with distilling equipment, and were heated to 180° C. under a nitrogen stream so as to distill off the resulting allyl alcohol. When about 100 g of allyl alcohol was distilled off, the pressure of the reaction system was reduced to 10 mmHg to increase the distillation rate of allyl alcohol. After a theoretical amount of allyl alcohol was distilled, heating was further continued for 1 hour, and the reaction system was finally retained at 190° C. and 1 mmHg for 1 hour. Then, the reactor was cooled, and 600 g of a polymerizable oligomer was obtained containing 8 wt % of a diallyl 1,4-cyclohexane-dicarboxylate monomer. This oligomer will be called "starting material-H".

Referential Example 9

500 g of a diallyl 1,4-cyclohexanedicarboxylate monomer, 119 g of 2-methyl-1,3-propanediol and 0.5 g of dibutyltin oxide were fed into a 1 l three-neck flask equipped with distilling equipment, and were heated to 180° C. under a nitrogen stream so as to distill off the resulting allyl alcohol. When about 100 g of allyl alcohol was distilled off, the pressure of the reaction system was reduced to 10 mmHg to increase the distillation rate of allyl alcohol. After a theoretical amount of allyl alcohol was distilled, heating was further continued for 1 hour, and the reaction system was finally retained at 190° C. and 1 mmHg for 1 hour. Then, the reactor was cooled, and 460 g of a polymerizable oligomer was obtained containing 11 wt % of a diallyl 1,4-cyclohexanedicarboxylate monomer. This oligomer will be called "starting material-I".

Examples 1 to 23

Each composition for polymerization was prepared in the blend ratio (wt %) shown in Table 1, and diisopropylperoxy dicarbonate (abbreviated as "IPP") was further added to each composition in the amount (wt %) also shown in Table 1. The mixture was subjected to casting polymerization using a cellophane-plated glass sheet, heated from 40° C. to 120° C. in the course of 2 hours and then retained at 120° C. for 1 hour to obtain an organic glass molded article. Various properties of each Example are shown in Table 1.

Comparative Example 1

As a comparative example, the procedures of Examples were carried out in the same way except that diethylene glycol bis(allyl carbonate) [CR-39, a product name of P.P.G. Industries, Inc. was employed. An organic glass molded article was obtained by curing the reaction product under the same curing condition as that of Examples.

Various properties of this molded article are also shown in Table 1, but cracks were likely to occur during molding, and impact resistance of the molded article was low.

Measurement of various properties was conducted using the following test methods.

1. Volume shrinkage ratio

The specific gravity before and after curing was calculated in accordance with the following formula:

$$\text{volume shrinkage ratio} = 1 - \frac{\text{specific gravity before curing}}{\text{specific gravity after curing}}$$

2. Transmittance

Measured in accordance with ASTM D-1003.

3. Refractive index and Abbe number:

Measured by an Abbe's refractometer (a product of Atago K.K.).

4. Surface hardness (pencil hardness)

Represented by the highest pencil hardness at which no damage occurred with a load of 1 kgf in accordance with JIS K-5400.

5. Impact. strength

An impact strength test was carried out in accordance with the drop weight impact test method in accordance with JIS K-7211 using a DuPont impact tester (a product of Toyo Seiki Seisakusho), a testpiece having a thickness of 3 mm and a drop weight mass of 500 g, to determine 50% destruction height.

TABLE 1

| | Example No. | | | | | | | | Comp. Examp. No. 1 |
|---|---|---|---|---|---|---|---|---|---|
| | 1 | 2 | 3 | 4 | 5 | 6 | 7 | 8 | |
| starting material | | | | | | | | | |
| A | 70 | | | | | 35 | 30 | | |
| B | | 60 | | | | 30 | | 30 | |
| C | | | 70 | | | | 30 | 35 | |
| D | | | | 70 | | | | | |
| E | | | | | 70 | | | | |
| F | | | | | | | | | |
| G | | | | | | | | | |
| H | | | | | | | | | |
| I | | | | | | | | | |
| allyl ester oligomer[1] | 62 | 49 | 63 | 62 | 64 | 56 | 54 | 56 | |
| diallyl monomer[1] | 8 | 11 | 7 | 8 | 6 | 9 | 6 | 9 | |
| CR-39 | 30 | 35 | 30 | 30 | 30 | 35 | 40 | 35 | 100 |
| 1,2-CHDA[2] | | | | | | | | | |
| 1,4-CHDA[3] | | | | | | | | | |
| viscosity cp 30° C. | 1300 | 1600 | 1200 | 1300 | 1100 | 1500 | 800 | 1500 | 22 |

TABLE 1-continued

| | | | | | | | | | |
|---|---|---|---|---|---|---|---|---|---|
| IPP | 3 | 3 | 3 | 3 | 3 | 3 | 3 | 3 | 3.5 |
| cured product | | | | | | | | | |
| volume shrinkage ratio | 6.5% | 7.2% | 6.3% | 6.4% | 6.2% | 6.8% | 6.4% | 6.8% | 13% |
| refractive index | 1.505 | 1.507 | 1.504 | 1.506 | 1.504 | 1.506 | 1.505 | 1.506 | 1.503 |
| Abbe number | 51 | 56 | 54 | 55 | 54 | 54 | 52 | 55 | 52 |
| total luminous transmittance | 94% | 93% | 94% | 94% | 94% | 93% | 94% | 93% | 94% |
| surface hardness | H | 3H | 2H | H | H | 2H | 2H | 3H | 2H |
| impact strength | 41 | 32 | 48 | 38 | 45 | 37 | 44 | 42 | 27 |

| | Example No. | | | | | | | | |
|---|---|---|---|---|---|---|---|---|---|
| | 9 | 10 | 11 | 12 | 13 | 14 | 15 | 16 | 17 |
| starting material | | | | | | | | | |
| A | 70 | | | | | 50 | 35 | | |
| B | | | | | | | | | |
| C | | | 70 | | | | | | |
| D | | | | | | | | | |
| E | | | | | 70 | | | | |
| F | | | | 85 | | | | | |
| G | | 50 | | | | | | | |
| H | | | | | | | | 50 | |
| I | | | | | | | | | 40 |
| allyl ester oligomer[1] | 62 | 48 | 63 | 50 | 64 | 45 | 31 | 46 | 36 |
| diallyl monomer[1] | 8 | 2 | 7 | 35 | 6 | 5 | 4 | 4 | 4 |
| CR-39 | 20 | 30 | 10 | 15 | 10 | 50 | 65 | 30 | 60 |
| 1,2-CHDA[2] | 10 | | | | 20 | | | | |
| 1,4-CHDA[3] | | 20 | 20 | | | | | | |
| isobornyl acrylate | | | | | | | | | |
| butyl acrylate | | | | | | | | | |
| methyl methacrylate | | | | | | | | 20 | |
| dimethyl maleate | | | | | | | | | |
| dibutyl maleate | | | | | | | | | |
| dibutyl fumarate | | | | | | | | | |
| viscosity cp 30° C. | 1100 | 300 | 900 | 60 | 800 | 120 | 70 | 60 | 70 |
| IPP | 3 | 3 | 3 | 3 | 3 | 3 | 3 | 3 | 3 |
| cured product | | | | | | | | | |
| volume shrinkage ratio | 6.9% | 8.2% | 6.7% | 9.3% | 6.8% | 8.7% | 9.6% | 9.3% | 9.4% |
| refractive index | 1.506 | 1.507 | 1.505 | 1.508 | 1.505 | 1.502 | 1.501 | 1.516 | 1.501 |
| Abbe number | 52 | 54 | 53 | 54 | 55 | 62 | 59 | 61 | 60 |
| total luminous transmittance | 94% | 94% | 94% | 94% | 94% | 93% | 93% | 91% | 93% |
| surface hardness | HB | H | H | 2H | HB | H | H | H | H |
| impact strength | 34 | 48 | 28 | 30 | 36 | 31 | 28 | 33 | 34 |

| | Example | | | | | |
|---|---|---|---|---|---|---|
| | 18 | 19 | 20 | 21 | 22 | 23 |
| starting material | | | | | | |
| A | 50 | 50 | 50 | 50 | 50 | 50 |
| B | | | | | | |
| C | | | | | | |
| D | | | | | | |
| E | | | | | | |
| F | | | | | | |
| G | | | | | | |
| H | | | | | | |
| I | | | | | | |
| allyl ester oligomer[1] | 45 | 45 | 45 | 45 | 45 | 45 |
| diallyl monomer[1] | 5 | 5 | 5 | 5 | 5 | 5 |
| Cr-39 | 30 | 30 | 30 | 30 | 30 | 30 |
| 1,2-CHDA[2] | | | | | | |
| 1,4-CHDA[3] | | | | | | |
| isobornyl acrylate | 20 | | | | | |
| butyl acrylate | | 20 | | | | |
| methyl methacrylate | | | 20 | | | |
| dimethyl maleate | | | | 20 | | |
| dibutyl maleate | | | | | 20 | |
| dibutyl fumarate | | | | | | 20 |
| viscosity cp 30° C. | 150 | 60 | 70 | 80 | 110 | 140 |
| IPP | 3 | 3 | 3 | 3 | 3 | 3 |
| cured product | | | | | | |
| volume shrinkage ratio | 6.4% | 9.2% | 9.1% | 9.0% | 8.8% | 8.7% |
| refractive index | 1.504 | 1.503 | 1.502 | 1.503 | 1.502 | 1.502 |
| Abbe number | 62 | 59 | 60 | 61 | 63 | 62 |

TABLE 1-continued

| | | | | | | |
|---|---|---|---|---|---|---|
| total luminous transmittance | 94% | 94% | 94% | 94% | 94% | 93% |
| surface hardness | 2H | 2B | H | H | 2B | B |
| impact strength | 32 | 58 | 36 | 46 | 55 | 51 |

[1] blend amount calculated from the compositions of the starting materials
[2] diallyl 1,2-cyclohexanedicarboxylate
[3] diallyl 1,4-cyclohexanedicarboxylate The composition for the optical material according to the present invention provides a transparent cured article which uses the economical starting materials, has a lower volume shrinkage ratio than conventional diethylene glycol bis(allyl carbonate) at the time of polymerization, is resistant to distortion at the time of curing and has high impact strength. Accordingly, it can be used not only for eyeglass lenses but also for various fields in which optical properties are of importance, such as prisms, optical disks, etc. Therefore, the present invention provides extremely high industrial values.

We claim:

1. A composition for an optical material consisting essentially of:

5 to 80% of a polyallyl carbonate of a linear or branched alkylene glycol represented by the following general formula (II)

$$(CH_2=CHCH_2\text{-}OCOO)_y\text{-}Y\text{-}OCOO\text{-}CH_2CH=CH_2 \quad (II)$$

wherein y is an integer of 1 to 10 and Y represents an organic residue derived from a $C_2$ to $C_{12}$ polyol having y+1 hydroxyl groups, 20 to 70 wt % of an allyl ester oligomer having allyl ester groups at the terminal ends thereof and recurring units represented by the following general formula (I)

$$\text{+}(COACOO)_x\text{—}Z\text{—}O\text{+} \quad (I)$$

wherein x is an integer of 1 to 10, A represents an organic residue represented by one of the following structures 1 to 6,

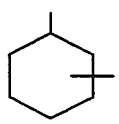

and Z is an organic residue of a $C_2$ to $C_{30}$ polyol having x+1 hydroxyl groups; and 0 to 50 wt % of at least one monomer selected from the group consisting of diallyl 1,2-, 1,3- and 1,4-cyclohexanedicarboxylates, diallyl 4-cyclohexene-1,2-dicarboxylate, diallyl methyl-4-cyclohexene-1,2-dicarboxylate, diallyl bicyclo-2-heptane-5,6-dicarboxylate, diallyl bicyclo-heptane-2,3-dicarboxylate, alkyl acrylate, alkyl methacrylate, diallyl maleate and dialkyl fumarate.

2. The composition as set forth in claim 1, wherein said polyallyl carbonate is diethylene glycol diallyl carbonate.

3. The composition as set forth in claim 1, wherein Z in said formula (I) is selected from organic residues of ethylene glycol, propylene glycol, 1,3-butane diol, 2-methyl-1,3-propanediol, and neopentyl glycol.

4. The composition as set forth in claim 1, which has a viscosity at 30° C. of 20 to 20,000 cps.

* * * * *